(12) United States Patent
Hertz et al.

(10) Patent No.: US 6,732,292 B2
(45) Date of Patent: May 4, 2004

(54) ADAPTIVE BI-DIRECTIONAL WRITE SKIP MASKS IN A DATA STORAGE DEVICE

(75) Inventors: Mark D. Hertz, Oklahoma City, OK (US); Philip E. Cloud, Edmond, OK (US); Travis D. Fox, Edmond, OK (US); Edwin S. Olds, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 226 days.

(21) Appl. No.: 10/090,876

(22) Filed: Mar. 4, 2002

(65) Prior Publication Data

US 2003/0056060 A1 Mar. 20, 2003

Related U.S. Application Data

(60) Provisional application No. 60/322,702, filed on Sep. 17, 2001.

(51) Int. Cl.$^7$ ................................................. G06F 11/20
(52) U.S. Cl. ...................... 714/8; 369/53.17; 360/77.05; 711/112
(58) Field of Search ................................. 711/112, 152, 711/153; 360/74.4, 77.05, 77.08, 78.14; 369/53.17; 712/224; 714/8

(56) References Cited

U.S. PATENT DOCUMENTS

| | | | |
|---|---|---|---|
| 5,313,626 A | 5/1994 | Jones et al. | |
| 5,530,829 A | 6/1996 | Beardsley et al. | |
| 5,584,007 A | 12/1996 | Ballard | |
| 5,636,355 A | 6/1997 | Ramakrishnan et al. | |
| 5,664,145 A | 9/1997 | Apperley et al. | |
| 5,727,183 A | 3/1998 | Takahashi | |
| 5,829,018 A | 10/1998 | Moertl et al. | |
| 5,875,455 A | 2/1999 | Ito | |
| 6,164,840 A | 12/2000 | Lynch | |
| 6,189,080 B1 | 2/2001 | Ofer | |
| 6,470,461 B1 * | 10/2002 | Pinvidic et al. | ................ 714/8 |
| 2001/0032292 A1 * | 10/2001 | Hoskins et al. | ............. 711/112 |

OTHER PUBLICATIONS

IBM Technical Disclosure Bulletin, Method for Skip Write Emulation. Apr. 2001, UK. Issue No. 444, p. 636.*
IBM Technical Disclosure Bulletin, Skip Mask Operation in a No–ID Disk Drive. Jun. 1, 1996, US. Vol 39, Issue No. 6, pp. 47–50.*
IBM Technical Disclosure Bulletin, Automated Hardware Processing of Direct Access Storage Device Skip Masks. May 1, 199 US. Vol. 39, Issue No. 5, pp. 121–122.*

* cited by examiner

Primary Examiner—B. James Peikari
(74) Attorney, Agent, or Firm—Fellers, Snider, et al.

(57) ABSTRACT

Method and apparatus for transferring data between a host device and a data storage device having a first memory space and a second memory space. The host issues access commands to store and retrieve data. The device stores write data associated with write commands in the first memory space pending transfer to the second memory space. An interface circuit evaluates relative proximity of first and second sets of LBAs associated with pending first and second write commands, and forms an adaptive bi-directional write skip mask when the sets of LBAs fit within a predetermined mask interval. The mask is preferably slidably adjustable to encompass both sets of LBAs and is preferably expandable to accommodate additional sets of LBAs. The data within the mask are treated as a combined write command and are thereafter written in an order corresponding to an order in which the data appear in the mask.

16 Claims, 7 Drawing Sheets

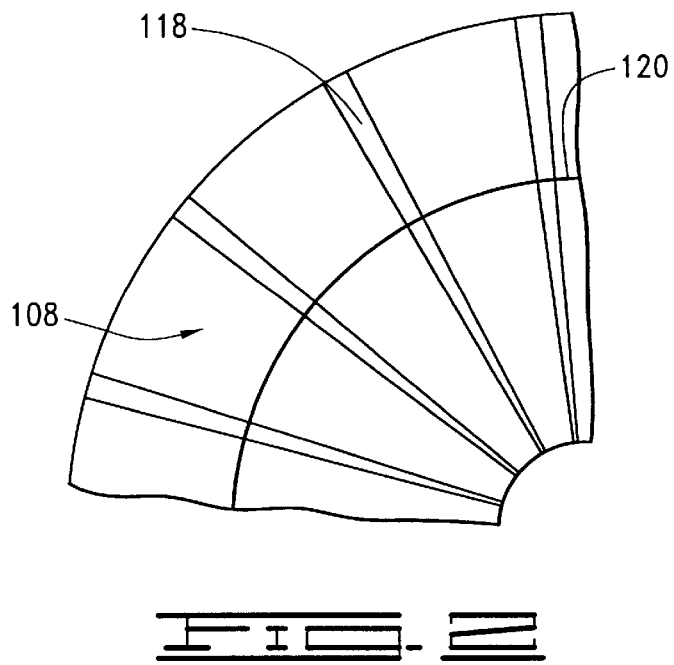
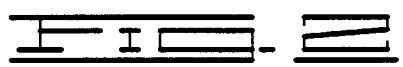
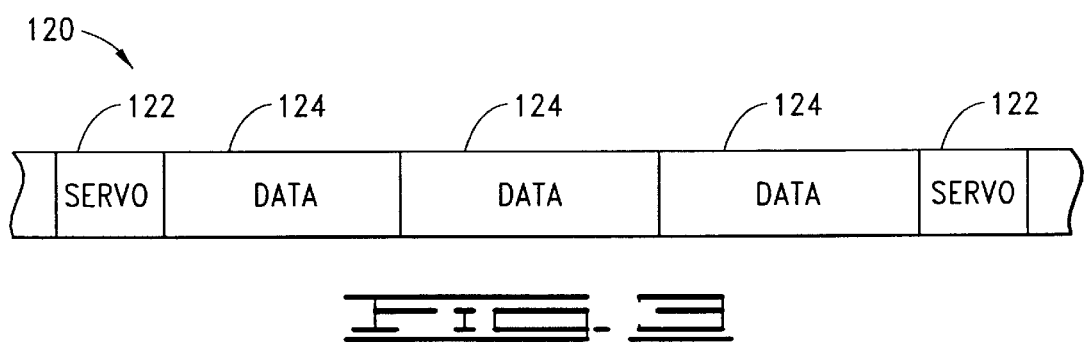
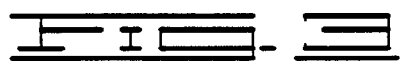

ADAPTIVE BI-DIRECTIONAL WRITE SKIP MASKS IN A DATA STORAGE DEVICE

RELATED APPLICATIONS

This application claims priority to U.S. Provisional Application No. 60/322,702 filed Sep. 17, 2001.

FIELD OF THE INVENTION

The claimed invention relates generally to the field of disc drive data storage devices, and more particularly, but not by way of limitation, to an apparatus and method for optimizing the transfer of data between a host device and a disc drive data storage device through the use of adaptive bi-directional write skip masks to combine multiple sets of write data associated with different write commands into a single combined write operation.

BACKGROUND

A disc drive is a data storage device used to store digital data. A typical disc drive includes a number of rotatable magnetic recording discs that are axially aligned and mounted to a spindle motor for rotation at a high constant velocity. A corresponding array of read/write heads access fixed sized data blocks (sectors) on tracks of the discs to write data to and to read data from the discs.

Disc drives are provided with servo control circuitry to move the heads to the various tracks, read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI). Communications and data transfers are carried out between host and drive in accordance with this protocol.

Disc drives of the present generation typically accommodate command queuing, which allows multiple input/output (I/O) commands to be received in a command queue and executed by the drive in an order different than that received. SCSI protocols currently support up to 256 pending commands in the command queue. A search strategy is used to execute the commands in an order that will potentially provide the highest transfer rate. For example, if several commands require access to data blocks close to the current position of the heads, and other commands require access to data blocks at distant locations on the discs, the drive may proceed to execute all of the local accesses before moving the heads to the distant locations and accessing the data blocks at the distant locations to minimize seek time (i.e., time spent moving from one track to the next).

The time required for a particular data block to rotate around and reach the head (latency) is an important factor when selecting the execution order, as delays in waiting for the disc to rotate significantly decrease the resulting transfer rate. Selection of the execution order typically includes estimating how much time it would take to reach each of the data blocks associated with the pending access commands based on latency and the time required to perform any necessary head switches and seeks.

A disc drive can typically employ various run-time selectable strategies (parameters) to improve data transfer performance, such as read on arrival (ROA) and read look ahead (RLA). ROA and RLA generally entail reading data blocks and placing the contents into the data buffer even though the host has not specifically requested the data from such data blocks, on the basis that the host may request the data in the near future.

ROA involves performing a seek command to move the head to a destination track on which a target data block resides, and commencing to read the preceding data blocks on the track until the target data block reaches the head. By contrast, RLA involves receiving a command to move to a new target track, but because the target data block is a large angular distance away from the head, the drive delays seeking to the new track and instead maintains the head on the current track and reads additional data blocks on the current track before moving to the destination track and reading the target data block. The foregoing strategies can provide improved performance under certain circumstances, such as when the command stream has a high degree of locality.

Another run-time selectable parameter that can improve data transfer performance is write caching. Write caching involves delaying the writing of data received from the host in favor of execution of other previously requested accesses (as opposed to immediately writing the data upon receipt). Advantages associated with write caching include the fact that more commands are available to choose from during the sorting strategy, which statistically improves overall access times.

However, allowing write data to linger in the buffer presents some disadvantages as well. Besides the risk of loss of data in the event of a power outage or other anomalous condition, the presence of large amounts of accumulated write data in the buffer takes up valuable space that could be utilized for readback data. Also, controller firmware routines typically only allow a maximum aging of any pending write command; thus, a substantial increase in service time can be observed if the interface circuit is forced to service a large number of write commands to purge old write data to the discs.

Accordingly, there is a need for improvements in the art to provide effective control of cached write data in a disc drive to improve data transfer performance.

SUMMARY OF THE INVENTION

In accordance with preferred embodiments, a disc drive data storage device is provided with a buffer (first memory space) and a number of rotatable discs (second memory space).

A host device issues access commands to the disc drive from time to time to transfer data between the host device and the discs. Such access commands include write commands to write sets of data (writeback data) to respective logical block addresses (LBAs) defined on the disc surfaces, and read commands to retrieve sets of previously recorded data (readback data) from selected LBAs on the disc surfaces.

A hardware/firmware based interface circuit employs write caching so that the writeback data are temporarily stored in the buffer pending transfer to the discs in accordance with a sort strategy that sorts the pending read and write access commands in an order designed to optimize data transfer performance.

Bi-directional adaptive write skip masks are employed to combine multiple pending sets of writeback data in the buffer into a single write operation. Each write skip mask generally comprises a selected interval of consecutive LBAs into which multiple writeback data sets are combined when the writeback data have associated LBA ranges that are sufficiently close to fit within the mask interval.

Preferably, as the drive receives each new write command, the interface circuit evaluates the newly added set of writeback data for inclusion into an existing mask. If the newly added set of writeback data does not fit within an existing mask, the interface circuit next determines whether the newly added set of writeback data can be combined with another pending set of writeback data to form a mask.

Each mask is characterized as being adaptive and bi-directional. When first and second sets of writeback data are evaluated for possible combination into a mask, the mask interval is placed over the first set of writeback data so that the mask includes a first portion of consecutive LBAs that precedes the first set of writeback data and a second portion of consecutive LBAs that follows the first set of writeback data. The interface circuit determines whether the second set of writeback data will fit within the first and second portions. Preferably, the mask is configured to be slidable as necessary to accommodate the second set of writeback data; that is, the range of the first portion can be increased or decreased (with a corresponding decrease or increase in the range of the second portion) in order to include both the first and second sets of writeback data within the mask interval.

When both of the writeback sets of data can be included within the mask interval, the mask is formed and a single, combined writeback command is formed in a command queue for subsequent execution. Execution of the combined writeback command results in the writing of the respective datasets in an order corresponding to the order in which the datasets appear in the mask. The mask range can be increased as desired to accommodate the addition of additional sets of writeback data.

The use of bi-directional adaptive masks as disclosed herein advantageously reduces computational overhead required to separately sort and select the individual write command nodes associated with different sets of writeback data in the buffer. Also, such masks advantageously allow writeback data from various commands received in descending order or in random order (with respect to LBA sequence) to be handled nominally as efficiently as writeback data received in ascending order.

These and various other features and advantages that characterize the claimed invention will be apparent upon reading the following detailed description and upon review of the associated drawings.

BRIEF DESCRIPTION OF THE DRAWINGS

FIG. 2 shows the manner in which embedded servo data are arranged on each of the disc recording surfaces of the disc drive of FIG. 1.

FIG. 3 shows the general format of each track on the disc recording surfaces.

DETAILED DESCRIPTION

Figure 1:
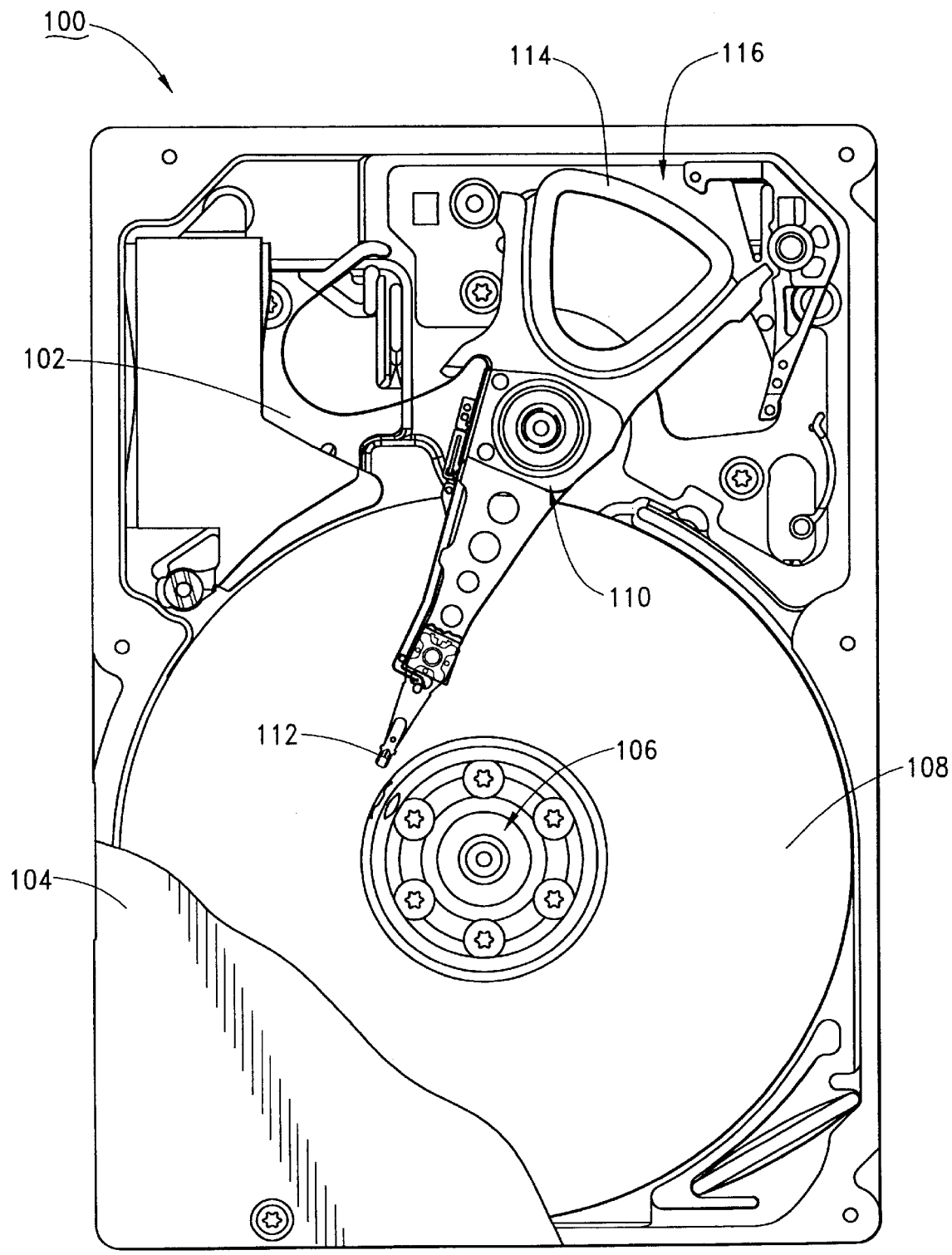
FIG. 1 is a plan view of a disc drive constructed and operated in accordance with preferred embodiments of the present invention.

Referring now to the drawings, FIG. 1 provides a top plan view of a disc drive 100 of the type used to store and retrieve computerized data. The disc drive 100 includes a rigid base deck 102 that cooperates with a top cover 104 (shown in partial cutaway) to form a sealed housing for the drive. Electrical communication and control electronics are provided on a disc drive printed circuit board (PCB) affixed to the underside of the base deck 102 (and hence, not visible in FIG. 1).

A spindle motor 106 rotates a number of rigid data recording discs 108 at a constant high speed. A rotary actuator 110 is positioned adjacent the discs 108 and supports a corresponding array of read/write data transducing heads 112. The actuator 110 is rotated through application of current to an actuator coil 114 of a voice coil motor (VCM) 116.

FIGS. 2 and 3 generally illustrate the manner in which servo data are stored on the disc surfaces, the servo data enabling the servo control circuitry to detect head position and velocity in order to position the actuator in a desired relation to the discs. The servo data are written using a servo track write (STW) process during disc drive manufacturing and are arranged in a plurality of radially extending servo wedges 118. Each wedge 118 comprises a plurality of adjacent servo fields 122 that are radially aligned to define each of the tracks on the disc surface (a portion of one such track is represented at 120 in FIGS. 2 and 3).

User data fields 124 (also "data sectors" or "sectors") are defined between adjacent servo fields 122 during a disc drive formatting operation. It will be recognized that the data sectors 124 are typically much longer than the servo fields 122 in order to maximize data capacity, so the aspect ratios and relative lengths of the fields in FIG. 3 are not represented to scale.

The host identifies the data sectors 124 in the disc drive 100 through the assignment of a unique logical block address (LBA) to each data sector. The LBAs typically range in consecutive order from 0 to n, with n constituting a large number (in the millions) depending upon the data storage capacity of the disc drive 100. Consecutively numbered LBAs are typically physically proximate one another within the disc drive 100.

A typical LBA assignment strategy involves assigning consecutive LBA numbers to all of the data sectors 124 on a cylinder by cylinder basis (i.e., all of the tracks on the different discs 108 at a given radius). For example, LBA 0 can be assigned to a first data sector 124 at an outermost data track 120 on the top disc surface. The remaining data sectors 124 on this track can then be assigned successive LBA values (1, 2, 3, etc.). LBAs are then assigned to the data sectors 124 in the remaining tracks in the cylinder, and then to the data sectors in the next adjacent cylinder, and so on.

Figure 4:
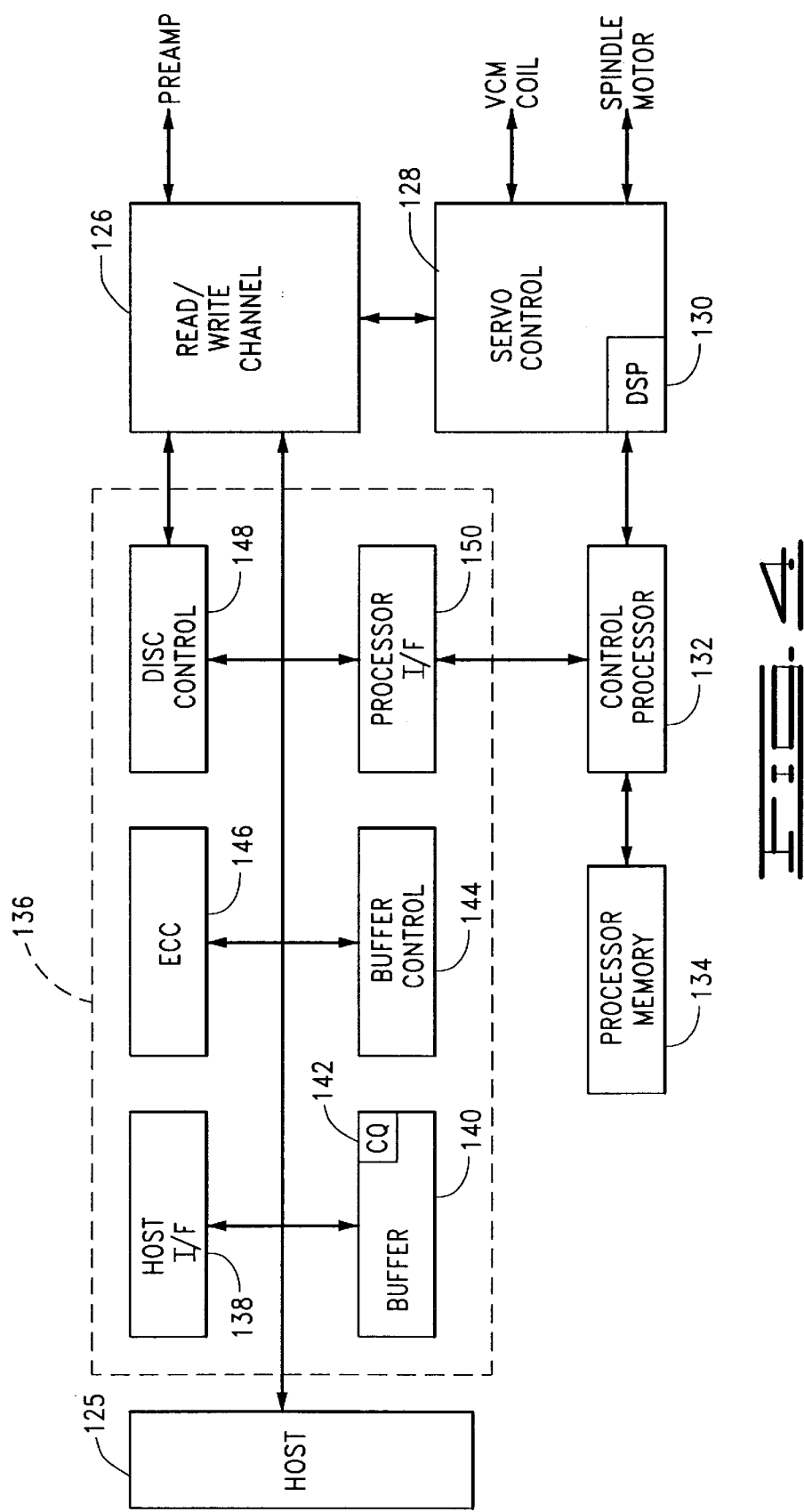
FIG. 4 is a functional block diagram of communication and control electronics of the disc drive of FIG. 1.

FIG. 4 provides a functional block diagram of relevant portions of the control circuitry of the disc drive 100 in conjunction with a host device 125. FIG. 4 shows the disc drive 100 to include a read/write channel 126, a servo control circuit 128 with programmable digital signal processor (DSP) 130, a top level control processor 132 (controller) with associated memory 134, and interface hardware 136. The controller 132, memory 134 and hardware 136 are collectively referred to herein as a "hardware/firmware based interface circuit," or just "interface circuit."

The read/write channel 126 operates as a communication channel to encode input data to be written to the discs 108 and to decode amplified readback signals to reconstruct data retrieved from the discs 108.

The servo control circuit 128 operates to demodulate head position and velocity from the servo data from the servo fields 122 (FIG. 3) and applies currents to rotate the actuator assembly 110 accordingly. The servo control circuit 128 also provides drive currents to the spindle motor 106 to rotate the discs 108 at operational speed during drive operation.

The control processor 132 provides top level control for the disc drive 100 in accordance with programming steps stored in processor memory 134 and host commands provided by the host device 125.

The interface hardware 136 includes a host interface (I/F) circuit 138 that controls the transfer of data and commands between the disc drive 100 and the host device 125. A buffer 140 with a command queue 142 temporarily stores data that are being transferred between the host and the discs 108. A buffer control circuit 144 controls the flow of data in and out of the buffer 140.

An error correction circuit (ECC) 146 applies on-the-fly error detection and correction algorithms to the retrieved data to correct detected errors in the retrieved data in the buffer 140. A disc control circuit 148 sequences the read and write operations by the read/write channel 126. A processor interface (I/F) 150 provides a communication path with the control processor 132.

For purposes of the present discussion, it will be contemplated that the interface circuit uses the Small Computer System Interface (SCSI) host interface protocol, although such is not limiting to the scope of the invention as claimed below. Hence, the command queue 142 can concurrently store up to a maximum number of pending access commands from the host, such as 64 or 256.

One type of access command is a write command from the host to write a set of data loaded into the buffer 140 by the host to a selected sector 124 (FIG. 3) on a selected disc surface; another type of access command is a read command from the host to retrieve the contents of a selected sector 124 (FIG. 3) on a selected disc surface to the buffer 140 for subsequent transfer to the host. The host identifies the desired sectors 124 in terms of LBAs, and the control processor 132 converts each LBA to a physical block address (PBA) to identify the cylinder, disc surface and angular location of the desired sector.

Figure 5:
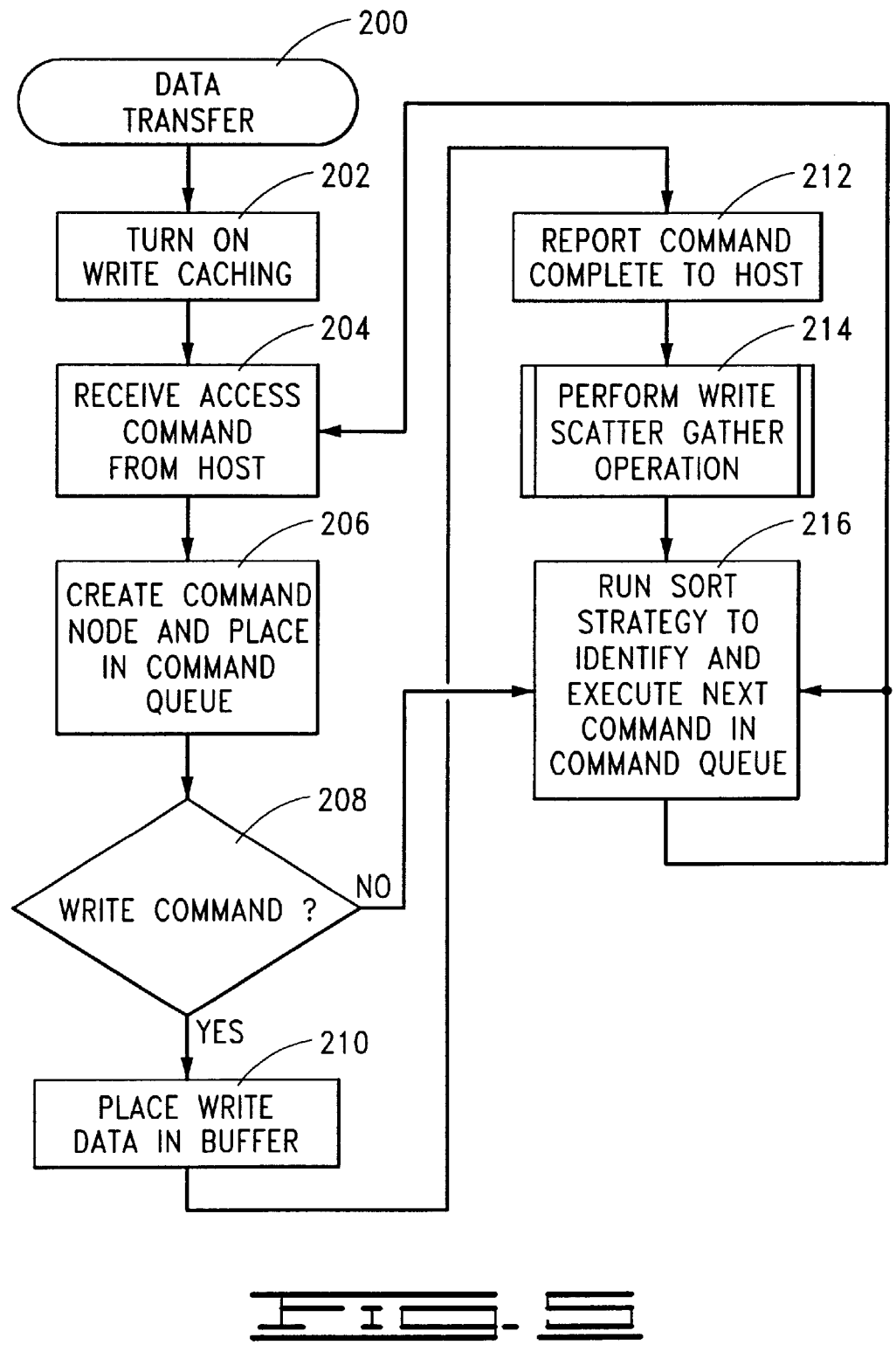
FIG. 5 is a flow chart for a DATA TRANSFER routine, generally illustrative of steps carried out by the disc drive in accordance with preferred embodiments of the present invention to transfer data between the disc drive and a host device.

The flow chart of FIG. 5 shows a DATA TRANSFER routine 200, illustrative of steps carried out in accordance with preferred embodiments of the present invention to optimize the transfer of data from a host to the disc drive 100. As discussed below, the interface circuit employs adaptive, bi-directional write skip masks to combine multiple pending sets of writeback data into single writeback blocks which are then scheduled for execution at appropriate times.

Each write skip mask generally comprises an interval of consecutive LBAs into which two or more sets of pending writeback data can be fitted. Each mask is preferably slidable and expandable, as desired. For reference, the label "write skip" generally refers to the fact that a small number of LBAs within the mask may exist between respective sets of writeback data; such intervening LBAs are "skipped over" after the conclusion of writing one set of writeback data and before the writing of another set of writeback data in the mask.

As indicated by the flow of FIG. 5, write caching is initially turned on during an initialization step at 202. As discussed above, write caching involves temporarily storing write data in the buffer 140 pending transfer of the write data to the discs at a later time, as opposed to immediately writing the data as when write caching is turned off.

Receipt of each new access command by the disc drive 100 during normal operation is represented at step 204. As will be recognized, during operation the host 125 issues access commands from time to time at a rate and in an order as determined by the needs of the host. Thus, there can be times when access commands are issued relatively infrequently and other times when a large number of access commands are issued in rapid succession. Each read access command identifies the LBAs on the discs 108 the contents of which the host requires the disc drive 100 to retrieve. Each write access command includes the write data that the host requires the disc drive 100 to store and identifies the specific LBAs in which the disc drive is to store the write data.

In response to each new access command received at step 204, the interface circuit creates a command node as a sortable access instruction in the command queue 142, as shown by step 206. Decision step 208 inquires whether the new access command is a write command; if so, the interface circuit places the write data in the buffer 140 pending transfer to the discs (step 210) and reports to the host 125 that the write command has been completed (step 212). Steps 210 and 212 are not performed, of course, if the access command is a read command.

Preferably, the buffer 140 is allocated among a number of variable length segments (such as 256 segments). The data associated with each access command are generally assigned to a different segment within the buffer 140. Thus, it will be understood that operation of step 212 preferably includes placement of the write data into a selected segment. For purposes herein, such pending write data are also referred to herein as "writeback" data.

With write caching activated, the drive proceeds to inform the host that the write command has been completed even though the write data are actually still pending in the buffer. Advantages of this approach include the fact that the host will not make further inquiries to the drive or halt further processing as the host waits to hear that the write command has been completed. The observed data transfer rate (at the bus between host and drive) will be higher at that point since the drive immediately reports that the write command has been completed. Also, a higher number of command nodes will typically be present in the command queue 142, allowing for statistically improved data transfer rates since more commands are available for selection at any given time.

A disadvantage with write caching, however, is that the drive must schedule the write commands in the near future and will not get credit from a data transfer rate perspective for the time during which the write commands are actually executed. Thus, if a large number of pending write commands are allowed to accumulate, the observed service time can increase significantly as the drive transfers the accumulated writeback data from the buffer 140 to the discs 108.

Accordingly, the flow of FIG. 5 continues to an ADAPTIVE WRITE SCATTER GATHER subroutine at step 214 which attempts to combine multiple, adjacent write command nodes into a single combined command node for more efficient processing of the data. The subroutine 214 will be discussed in greater detail with regard to FIGS. 6–10. At this point it will be noted that at the conclusion of step 214 the flow of FIG. 5 passes to step 216 where a conventional sort strategy is performed to identify and execute the next appropriate command (read command, write command, or combined write command as provided by step 214).

It will be noted that the operation of steps 204 and 216 are asynchronous; new commands will be received from time to time at step 204 as dictated by the host 125 and the sort strategy step 216 will continue to sequentially select and execute command nodes in the command queue 142 so long as at least one command node remains in the queue.

Figure 6:
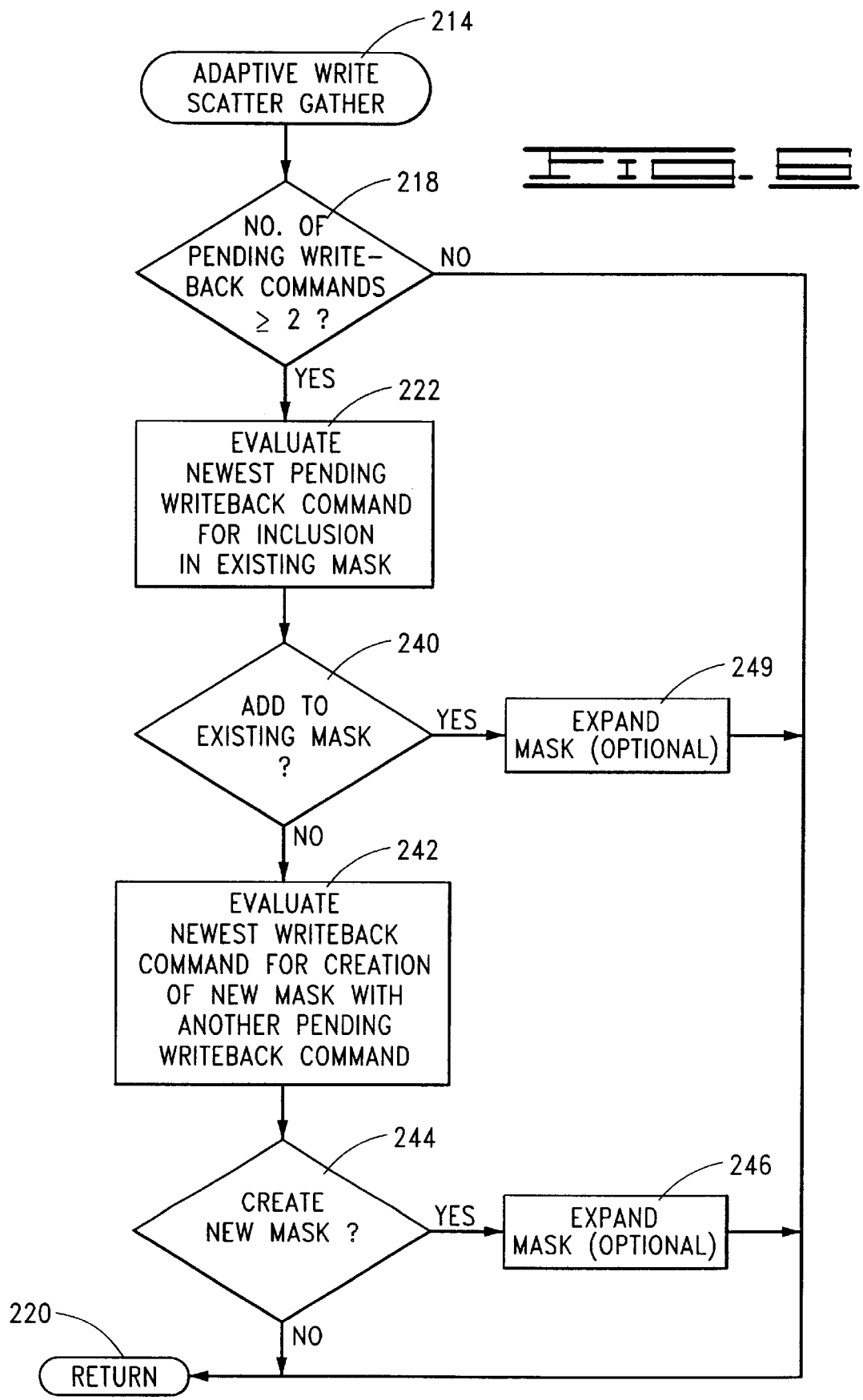
FIG. 6 is a flow chart for an ADAPTIVE WRITE SCATTER GATHER routine that is a subroutine of the DATA TRANSFER routine of FIG. 5.

Referring now to the ADAPTIVE WRITE SCATTER GATHER subroutine 214 of FIG. 6, the routine first determines at step 218 whether two or more write command nodes (writeback commands) are presently pending in the command queue 142. This step is performed since the routine requires at least two pending writeback commands before a combining of writeback commands can take place. If two or more writeback commands are not presently pending, the routine simply returns to the routine of FIG. 5 at step 220.

Figure 7:
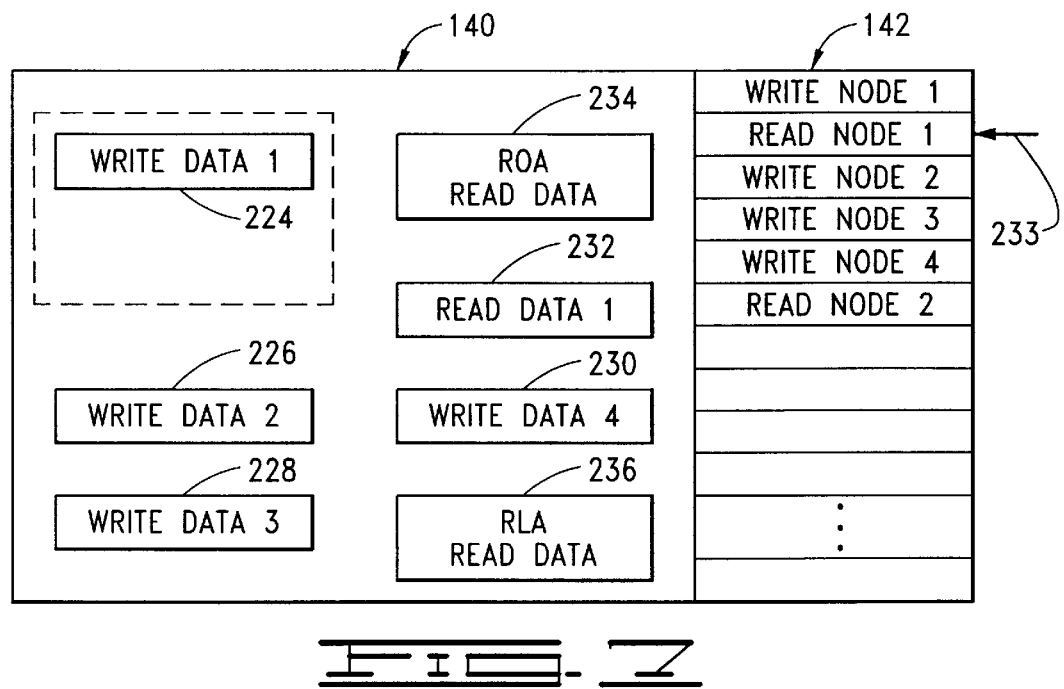
FIG. 7 provides a memory space representation of the disc drive buffer.

On the other hand, when two or more write command nodes are pending in the command queue 142, the routine passes to step 222 where the newest (most recently received) writeback command is evaluated for inclusion into an existing write skip mask. FIG. 7 has been provided to more clearly illustrate this step.

FIG. 7 is a generalized block representation of the buffer 140 and associated command queue 142 at a given instant in time during the operation of the routines of FIGS. 5 and 6. The buffer 140 is represented as an addressable memory space in which various blocks of read and write data are temporarily stored. For purposes hereinbelow, the buffer is also referred to as a first memory space; the discs 108 are also collectively referred to as a second memory space.

The buffer 140 is shown in FIG. 7 to include four sets of pending writeback data 224, 226, 228 and 230 respectively identified as WRITE DATA 1 through WRITE DATA 4. These respective sets of writeback data represent blocks of data that have been provided with associated write commands from the host device 125 for transfer to the discs 108, with WRITE DATA 4 representing the most recently received writeback data. At this point it will be noted that no write skip masks have been formed in the buffer 140. Write command nodes (WRITE NODE 1 through WRITE NODE 4) for the sets of write data 224, 226, 228 and 230 were generated and placed into the command queue 142 during the operation of step 206 in FIG. 5 as each new command was received in turn.

The buffer 140 is further shown in FIG. 7 to include a set of read data 232 (READ DATA 1), which represents read data associated with a read command from the host device 125. The read data 232 are temporarily stored in the buffer 140 pending completion of on-the-fly error detection and correction operations by the ECC block 146 (FIG. 4). A read command node READ 1 in the command queue 142 is associated with this read command.

It will be observed that the drive 100 is presently servicing the READ NODE 1 command node since the read data 232 are in the process of being transferred to the buffer 140 from the associated disc 108 (FIG. 1). This condition is also indicated by a stack pointer 233. A second read command node (READ NODE 2) is also pending in the command queue 142, but this second command node is still waiting execution by step 216 in FIG. 5 and thus, the associated read data have not yet been transferred to the buffer 140.

The buffer 140 further includes additional read data blocks including read on arrival (ROA) read data 234 and read look ahead (RLA) read data 236. The ROA and RLA read data 234, 236 constitute read data that the drive 100 has proceeded to store in the buffer 140 without prompting by the host 125 on the basis that the host 125 might issue a request for such data in the near future. It will be understood that the various sets of write and read data 224, 226, 228, 230, 232, 234, 236 represent various amounts of user data associated with different LBAs (data sectors 124) on the various disc surfaces, and which are stored in different segments (not separately denoted) at various locations within the memory space of the buffer 140. Although actual writeback data sets can vary widely in size, for simplicity of illustration it will be contemplated that the writeback data sets 224, 226, 228 and 230 are each 20 LBAs in size.

Figure 8:
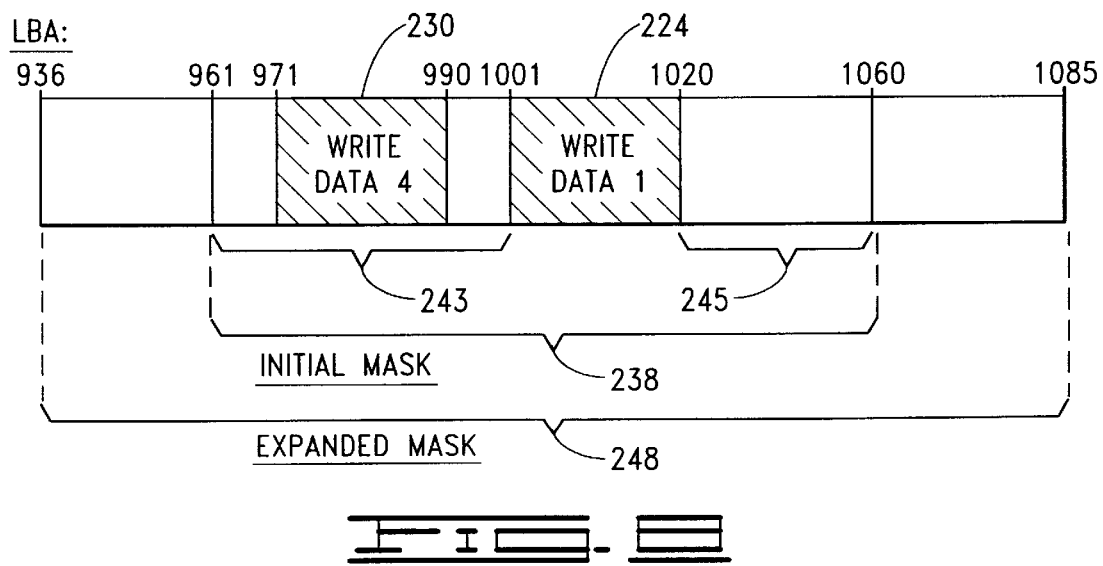
FIG. 8 generally illustrates a write skip mask formed in accordance with the routines of FIGS. 5 and 6.

FIG. 8 shows a bi-directional write skip mask 238. The mask 238 represents a moveable and expandable interval, or range of consecutive LBAs, within which two or more adjacent writeback data sets are placed to provide a single combined write command. Execution of a combined write command node results in the successive writing of the respective data sets during a single pass through the sort strategy step 216 in FIG. 5.

An advantage of the use of write skip masks such as 238 is the reduction in the computational overhead required to separately sort and select the additional write command node(s) associated with the additional set(s) of data within a given mask. As will become apparent below, another advantage of the use of the adaptive, bi-directional masks such as 238 is that writeback data from various commands received in descending order or in random order (with respect to LBA sequence) can be handled nominally as effectively as writeback data received in ascending order. It is contemplated that the interface circuit is configured to accommodate up to a selected number of masks at a given time (such as 32 masks).

Once the first set of writeback data within a given mask is selected by the sort strategy step 216, all of the remaining writeback sets within the mask are automatically written in turn. Referring again to FIG. 6, since no preexisting masks have previously been formed among the WRITE DATA 1, WRITE DATA 2 and WRITE DATA 3 data sets 224, 226 and 228, the answer to the inquiry at decision step 240 is no; that is, WRITE DATA 4 is not added to an existing mask. The flow then passes to step 242 when the WRITE DATA 4 set 230 is evaluated for creation of a new mask with any, some or all of the currently pending data sets 224, 226, 228 (WRITE DATA 1, 2, 3).

As shown in FIG. 8, the interface circuit compares the range of LBAs associated with the newest selected set of writeback data (in this case WRITE DATA 4 230) with the range of LBAs associated with the remaining sets of write data (in this case 224, 226, 228) to determine whether the newest set of writeback data is within the mask interval of the existing set or sets of write data. This search is both forward and backward in direction with respect to each remaining set of data 224, 226, 228 in turn.

Assume that the 20 LBAs associated with the set of write data 224 (WRITE DATA 1) are LBAs 1001 to 1020. The initial mask length is 100 LBAs. Centering the write data 224 within the mask 238 (as shown in FIG. 8) provides an interval of consecutive LBAs from LBA 961 to LBA 1060.

This interval includes a first, leading portion 243 comprising LBAs 961 to 1000 and a second, trailing portion 245 comprising LBAs 1021 to 1060. Thus, the operation of step 242 (FIG. 6) preferably includes determining whether WRITE DATA 4 set 230 falls within the first and second portions 243, 245.

At this point it will be noted that the first and second portions 243, 245 are preferably adjustable in size; that is, the mask interval can be slidably moved with respect to the WRITE DATA 1 set of writeback data so that the first portion 243 is increased (or decreased) and the second portion 245 is correspondingly decreased (or increased). Stated another way, the WRITE DATA 1 can be shifted toward the front or toward the end of the mask interval as needed to increase the ability to encompass both the WRITE DATA 1 and the WRITE DATA 4 into a common mask.

Continuing with the present example, let it be contemplated that the fourth set of write data 230 (WRITE DATA 4) shown in FIG. 7 constitutes LBAs 971 to 990. Hence, the write data 230 readily fits within the first portion 243 of the mask 238. The routine 214 thus proceeds to step 244 where the write skip mask is created. It will be noted that, unless additional sets of writeback data are subsequently added to the mask, the interface circuit will treat the data from LBA 971 to LBA 1020 as a single block of writeback data, and will skip over the intervening LBAs 991 to 1000 between WRITE DATA 4 and WRITE DATA 1 during the subsequent writing of the data.

Figure 9:
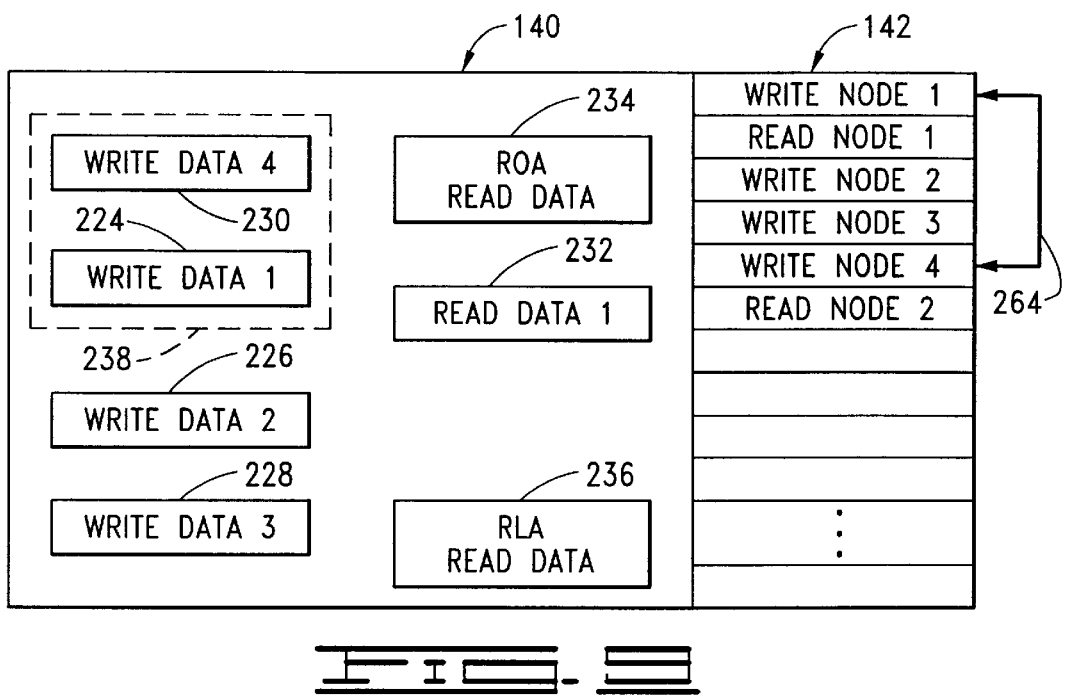
FIG. 9 provides another memory space representation of the disc drive buffer.

FIG. 9 provides a depiction of the buffer 140 similar to that previously provided in FIG. 6 except that the WRITE DATA 4 set of write data 230 is now included within the mask 238. Although the write data 230 are shown to be moved to the upper left hand corner of the memory space, preferably no physical movement of the write data 230 within the memory is necessary for inclusion within the mask 238. In this regard, the mask 238 can be thought of as a relational set. Pointers (not depicted) or other suitable methodologies can be used to link the data sets 228, 230 with the mask 238. Nevertheless, the reordering shown in FIG. 9 helps illustrate the results of the operation of step 244 in FIG. 6.

Continuing with the flow of FIG. 6, the routine passes from decision step 244 to step 246 wherein the mask size is optionally adjusted by a selected amount, such as an additional 50 LBAs. Such expansion is shown in FIG. 8 to provide an expanded mask 248, which now (in the current example) extends from LBA 936 to LBA 1085. Expansion of the mask at step 246 is optional, since the mask may already be of sufficient size to add additional write data. However, expansion is an attractive option in cases where LBAs of write data are close to the boundaries of the existing mask. A similar optional mask size expansion step is shown at step 249 in FIG. 6 when writeback data are added to an existing mask (decision step 240). The routine then returns to the flow of FIG. 5 at step 220.

Figure 10:
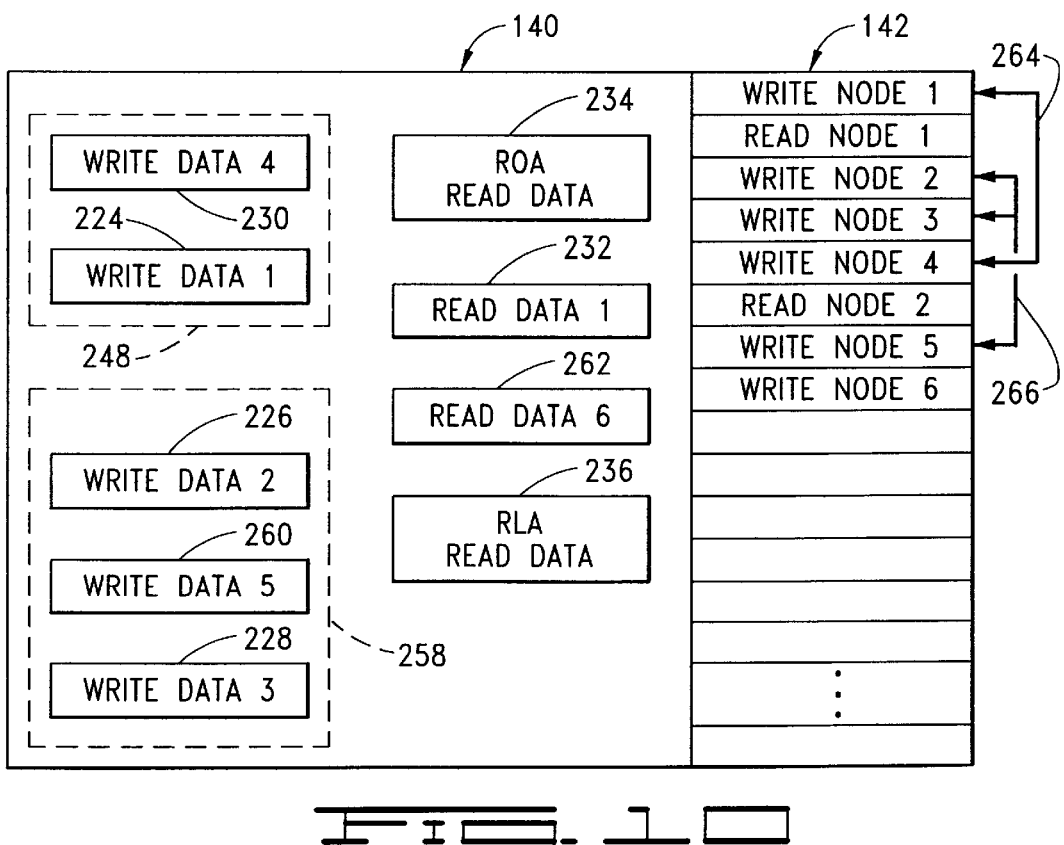
FIG. 10 provides yet another memory space representation of the disc drive buffer.

FIG. 10 provides another representation of the buffer 140 in which the DATA WRITE 1 and DATA WRITE 4 sets 224, 230 have been grouped together into the expanded write skip mask 248. A second write skip mask 258 is also shown in FIG. 10, with the second write skip mask 258 including the DATA WRITE 2 and DATA WRITE 3 sets 226, 228 of FIGS. 6 and 9, as well as a new, fifth set of write data 260. The WRITE DATA 5 set 260 was found upon evaluation to fit between the WRITE DATA 2 and WRITE DATA 3 sets 226, 228. A sixth set of write data 262 was subsequently added subjected to the routine of FIG. 6, but was not combined with either of the existing masks 248, 258.

The interface circuit keeps track of the respective sets of write data associated with each mask 248, 258 and further tracks the order of the write data within each mask. Execution of the command node associated with the first set of write data in a given mask is automatically followed by execution of the remaining command nodes associated with the mask. For example, execution of the WRITE 4 command node (mask 248 in FIG. 10) results in the writing of the WRITE DATA 4 set of write data 230 (LBAs 971 through 990), immediately followed by the writing of the WRITE DATA 1 set of write data 224 (LBAs 1001 through 1020).

In this manner, the WRITE 4 command node and the WRITE 1 command node are treated as a single command node (such as combined node 264 in FIGS. 9 and 10) which requires only one selection operation to result in the writing of both sets of associated write data 230, 224. Similarly, the WRITE 2, WRITE 5 and WRITE 3 command nodes of FIG. 10 are combined into a second combined command node 266 which is executed in an order determined in relation to the order of the LBAs of the respective data sets 226, 260 and 228 within the mask 258. It is contemplated that the interface circuit can be readily configured to leave the existing command nodes in the command queue 142 and track the combined nodes separately, or remove the existing command nodes from the command queue 142 and physically place a replacement combined command node (such as a WRITE NODE 1+4 command node) in the command queue 142 for sorting during step 216 (FIG. 5).

It will now be recognized that the present invention as embodied herein and as claimed below is generally directed to an apparatus and method for transferring data from a data storage device to a host device. In accordance with preferred embodiments, a disc drive data storage device (such as 100) is provided with a first memory space (such as buffer 140) and a second memory space (such as discs 108).

A host device (such as 125) issues access commands (such as by step 204) including first and second write commands to request writing of respective first and second sets of data (such as 224, 230) to respective first and second sets of logical block addresses (LBAs) in the second memory space. An interface circuit (such as 132, 134, 136) of the data storage device temporarily stores the first and second sets of data in the first memory space pending transfer to the second memory space (such as by step 212). The interface circuit proceeds to sort the pending access commands in accordance with a sort strategy to increase data transfer performance (such as by step 216).

The interface circuit operates to implement an adaptive, bi-directional write skip mask (such as 238) comprising a selected interval of consecutive LBAs having a first portion (such as 243) which immediately precedes the first set of LBAs (such as 224) and a second portion (such as 245) which immediately follows the first set of LBAs. The mask is formed when the second set of LBAs fits within the first or second portion.

The first and second write commands are combined into a single combined write command (such as 264, 266) which is scheduled for subsequent execution (such as by step 216). Upon execution, the combined write command results in the successive transfer of the first and second sets of data from the first memory space to the second memory space, wherein during said execution the first set of data is transferred followed by the second set of data when the second set of LBAs is encompassed within the second portion of the write skip mask, and wherein during said execution the second set of data is transferred followed by the first set of data when the second set of LBAs is encompassed within the first portion of the write skip mask.

When the second set of LBAs is not encompassed within the first or second portions of the write skip mask (such as by step 244), the interface circuit proceeds to separately execute the first and second write commands at different times (such as by step 216). Additional write skip masks are generated and evaluated for additional combinations of write commands as desired.

For purposes of the appended claims, the structure that carries out the recited function of the "first means" will be understood to correspond to the disclosed control processor 132 of FIG. 2 with programming in accordance with the routines of FIGS. 5 and 6.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the data transfer routine without departing from the spirit and scope of the present invention.

In addition, although the embodiments described herein are directed to the transfer of data in a disc drive, it will be appreciated by those skilled in the art that the process can be used in other types of data storage devices without departing from the spirit and scope of the claimed invention.

What is claimed is:

1. A method for transferring data between a host device and a data storage device having a first memory space and a second memory space, comprising:
   issuing first and second write commands to request writing of respective first and second sets of data to respective first and second sets of logical block addresses (LBAs) in the second memory space;
   temporarily storing the first and second sets of data in the first memory space pending transfer to the second memory space;
   forming an adaptive bi-directional write skip mask comprising a predetermined interval of consecutive LBAs including a first portion which immediately precedes the first set of LBAs and a second portion which immediately follows the first set of LBAs, wherein the mask is formed when the second set of LBAs fits within the first or second portions; and
   executing a single combined write command to transfer the first and second sets of data to the second memory space in an order determined by an order in which the first and second sets of LBAs appear in the mask.

2. The method of claim 1, wherein the forming step comprises sliding the predetermined interval of consecutive LBAs of the mask to selectively increase or decrease the first portion and correspondingly decrease or increase the second portion in order to fit the second set of LBAs within the first or second portions.

3. The method of claim 1, wherein the first memory space comprises a buffer and the second memory space comprises a magnetic recording disc.

4. A method for transferring data between a host device and a data storage device, comprising:
   issuing first and second write commands to request writing of respective first and second sets of data to respective first and second sets of logical block addresses (LBAs) in a memory space of the data storage device;
   temporarily storing the first and second sets of data in a buffer of the data storage device pending transfer to the memory space;
   evaluating relative proximity of the first and second sets of LBAs; and
   forming an adaptive bi-directional write skip mask comprising a predetermined interval of consecutive LBAs having a first portion immediately preceding the first set of LBAs and a second portion immediately following the first set of LBAs, said mask formed when the second set of LBAs is encompassed within the first or second portions.

5. The method of claim 4, wherein the forming step comprises sliding the predetermined interval of consecutive LBAs of the mask to selectively increase or decrease the first portion and correspondingly decrease or increase the second portion in order to fit the second set of LBAs within the first or second portions.

6. The method of claim 4, further comprising:
   executing a first single combined write command to successively transfer the second set of data followed by the first set of data to the memory space when the second set of LBAs is encompassed within the first portion;
   executing a second single combined write command to successively transfer the first set of data followed by the second set of data to the memory space when the second set of LBAs is encompassed within the second portion; and
   separately executing the first and second write commands at different times to transfer the respective first and second sets of data to the memory space when the second set of LBAs is not encompassed within the first portion and is not encompassed within the second portion.

7. The method of claim 4, further comprising:
   issuing a third write command to request writing of a third set of data to a third set of logical block addresses (LBAs) in the memory space;
   temporarily storing the third set of data in the buffer; and
   adding the third set of data to the mask when the third set of LBAs is encompassed within the predetermined interval of consecutive LBAs of the mask.

8. The method of claim 7, wherein the predetermined interval of consecutive LBAs of the mask is characterized as an initial interval, and wherein the method further comprises increasing the initial interval to an expanded interval of consecutive LBAs so that the third set of data is evaluated to determine whether the third set of LBAs is encompassed within the expanded interval.

9. A disc drive data storage device configured to store and retrieve data from a host device, comprising:
   a data recording surface on which data are stored in a number of data sectors to which consecutive logical block addresses (LBAs) are assigned;
   a data transducing head controllably positionable adjacent the data recording surface;
   an interface circuit coupled to the head and which receives read commands identifying LBAs from which data are to be retrieved to the host device and write commands identifying LBAs to which write data from the host device are to be stored, the interface circuit comprising a buffer in which at least first and second sets of write data associated with respective first and second write commands are temporarily stored pending transfer to the data recording surface, the first and second sets of write data having associated first and second sets of LBAs; and wherein the interface circuit evaluates relative proximity of the first and second sets of LBAs and forms an adaptive bi-directional write skip mask comprising a predetermined interval of consecutive LBAs having a first portion immediately preceding the first set of LBAs and a second portion immediately following the first set of LBAs, said mask formed when the second set of LBAs is encompassed within the first or second portions.

10. The disc drive data storage device of claim 9, wherein the interface circuit slides the predetermined interval of consecutive LBAs of the mask to selectively increase or decrease the first portion and correspondingly decrease or increase the second portion in order to fit the second set of LBAs within the first or second portions.

11. The disc drive data storage device of claim 9, wherein the interface circuit subsequently schedules execution of a combined writeback command to concurrently write the first and second sets of data to the data recording surface in an order determined by an order in which the first and second sets of data appear in the mask.

12. The disc drive data storage device of claim 9, wherein the interface circuit further operates to evaluate proximity of a third set of LBAs of a third set of data associated with a third write command to the first and second sets of LBAs and adds the third set of LBAs to the mask when the third set of LBAs fits within the predetermined interval of consecutive LBAs of the mask.

13. The disc drive data storage device of claim 9, wherein the predetermined interval of consecutive LBAs of the mask is characterized as an initial interval, and wherein the interface circuit further increases the initial interval to an expanded interval of consecutive LBAs.

14. The disc drive data storage device of claim 13, wherein the interface circuit further operates to evaluate proximity of a third set of LBAs of a third set of data associated with a third write command to the first and second sets of LBAs and adds the third set of LBAs to the mask when the third set of LBAs fits within the expanded interval of consecutive LBAs.

15. A disc drive data storage device configured to store and retrieve data from a host device, comprising:
- a data recording surface on which data are stored in a number of data sectors to which consecutive logical block addresses (LBAs) are assigned;
- a data transducing head controllably positionable adjacent the data recording surface; and
- an interface circuit which schedules execution of pending read and write commands received from the host, comprising:
  - a buffer in which first and second sets of write data associated with respective first and second write commands are temporarily stored pending transfer to the data recording surface, the first and second sets of write data having associated first and second sets of LBAs; and
  - first means coupled to the buffer for providing a bi-directional write skip mask comprising a sequence of consecutive LBAs which precede and follow the first set of LBAs and for combining the first and second write commands into a single combined write command when the second set of LBAs is encompassed within the write skip mask.

16. The disc drive data storage device of claim 15, wherein the first means comprises a programmed control processor.

* * * * *